United States Patent [19]

Breazeale et al.

[11] Patent Number: 4,758,203

[45] Date of Patent: Jul. 19, 1988

[54] METAL CRUCIFORM JOURNAL FORGING AND METHOD OF MAKING SUCH A FORGING

[75] Inventors: C. Lee Breazeale; Frank A. Jones, both of Memphis, Tenn.; Andrew G. Torok, Shreveport, La.

[73] Assignee: C.L.B. Enterprises, Inc., Memphis, Tenn.

[21] Appl. No.: 785,882

[22] Filed: Oct. 9, 1985

Related U.S. Application Data

[63] Continuation of Ser. No. 433,260, Oct. 7, 1982, Pat. No. 4,580,432.

[51] Int. Cl.$^4$ .............................................. F16D 3/16
[52] U.S. Cl. .................................................. 464/136
[58] Field of Search ................. 72/259, 261, 353, 354, 72/357, 377; 464/136; 29/157 R

[56] References Cited

U.S. PATENT DOCUMENTS

| | | | |
|---|---|---|---|
| 1,682,399 | 8/1928 | Mitchell | 72/261 |
| 2,149,508 | 3/1939 | Coe | 72/354 |
| 2,224,670 | 12/1940 | Criley | 29/157 R |
| 2,663,205 | 12/1953 | Allen | 72/354 |
| 3,286,502 | 11/1966 | Cogan | 72/259 |
| 3,896,651 | 7/1975 | Starkier | 72/260 |

FOREIGN PATENT DOCUMENTS

| | | | |
|---|---|---|---|
| 780637 | 3/1968 | Canada | 72/259 |
| 258061 | 4/1949 | Switzerland | 72/353 |
| 1197470 | 7/1970 | United Kingdom | 72/354 |
| 2095147 | 9/1982 | United Kingdom | 72/377 |

Primary Examiner—Lowell A. Larson
Attorney, Agent, or Firm—John F. A. Earley; John F. A. Earley, III

[57] ABSTRACT

A metal journal forging has a central body portion and four substantially equal legs circular in cross section which are integral with the body portion with the axis of each leg being at substantially a right angle to the axis of each adjacent leg. A curved portion extends between each adjacent pair of legs. The flow lines of the grain structure of the forging in each quadrant formed by the axes of the legs are substantially parallel the contours of the exteriors of the legs and curved arcuate portion in the quadrant. The method for forming a metal cruciform journal forging comprises placing a metal forging billet in a die assembly having a main cavity for the reception of the metal cylinder and a pair of opposed cavities branching off from the main cavity at 90° to the main cavity. Equal compressive forces are exerted on the opposite ends of the billet in the direction of the billet axis to advance each of said ends towards each other at substantially the same rate and for the same predetermined distance to form two substantially equal opposed legs in the main cavity and force a portion of the metal billet into said branching cavities to form two substantially equal opposed legs substantially equal in length to the first two mentioned legs in the main cavity.

17 Claims, 3 Drawing Sheets

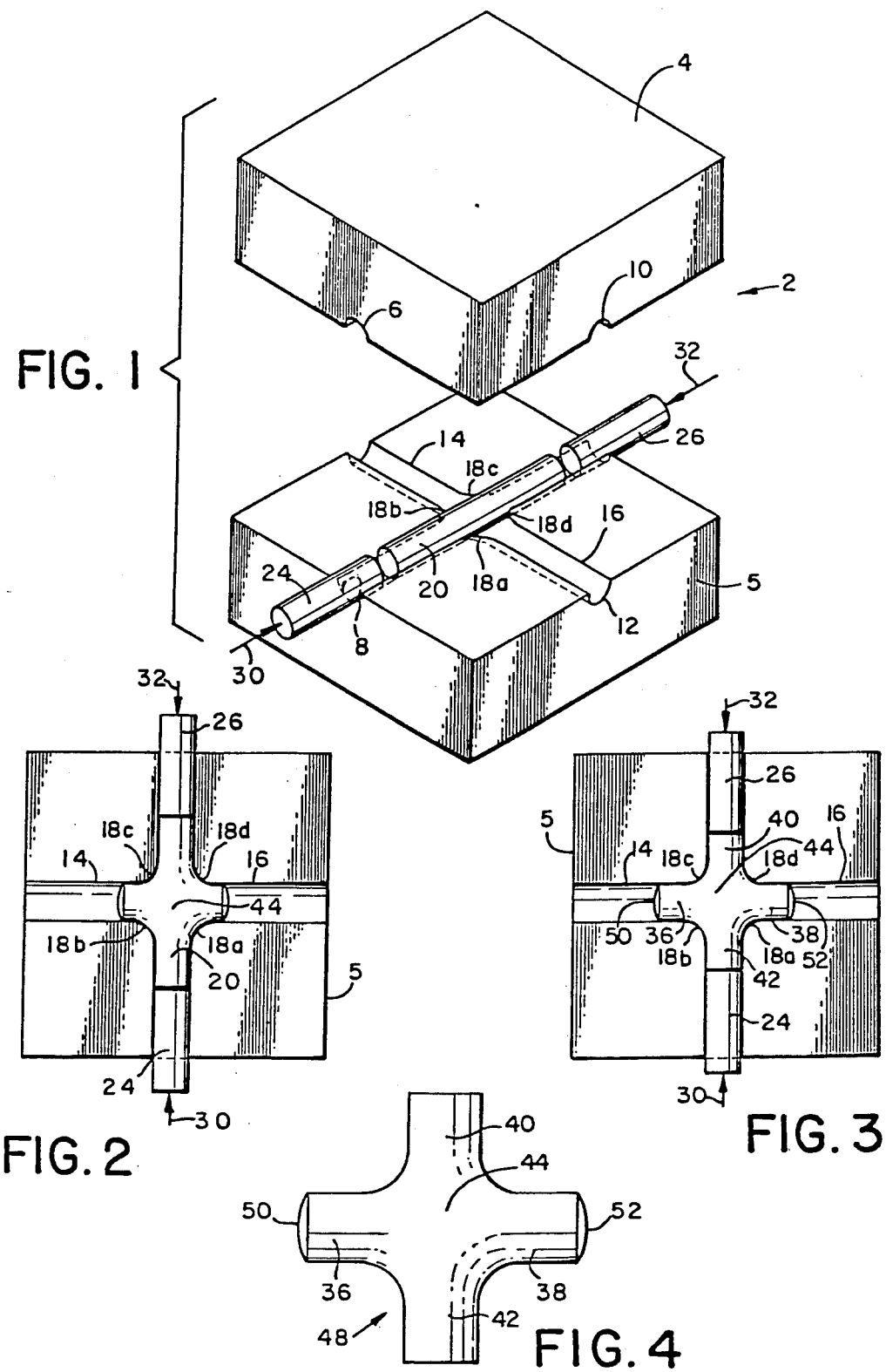

METAL CRUCIFORM JOURNAL FORGING AND METHOD OF MAKING SUCH A FORGING

This is a continuation of co-pending application Ser. No. 433,260 filed on Oct. 7, 1982, now U.S. Pat. No. 4,580,432 granted Apr. 8, 1986.

TECHNICAL FIELD

This invention is in the forging field.

BACKGROUND OF THE PRIOR ART

It is well known to employ dies and the like for forming metal parts as seen for example in U.S. Pat. Nos. 2,526,489 to Liddicoat, 3,038,220 to Saives, 3,286,502 to Cogan, 3,583,198 to Drallmeier and 3,896,651 to Starkier. Saives U.S. Pat. No. 3,038,220 relates to pressure die casting and is not relevant to the making of forged spiders.

Liddicoat U.S. Pat. No. 2,526,489 teaches the use of a forging billet and die for making drill bits.

Cogan U.S. Pat. No. 3,286,502 teaches the use of a forging billet with pressure exerted on opposite ends of the billet to extrude the billet through one or more side openings of a die to form air foil sections.

U.S. Pat. Nos. 3,583,198 and 3,896,651 teach extrusion die forming of universal joint spiders. The U.S. Pat. No. 3,583,198 supports one end of a forging billet in a die and exerts force on the other end of the billet to extrude the billet into four equally spaced die openings. The U.S. Pat. No. 3,896,651 supports the bottom of a forging billet and exerts force on the top end of the billet to extrude it between base columns to form a preform spider which is then further shaped in a forming die. The first forging step is said to reduce the amount of flash in the second step and hence reduce the amount of material used. The spiders produced by these patents have different grain structures as is detailed later.

The conventional (and heretofore accepted to be the best) method for forming a cruciform journal forging such as a universal joint spider forging prior to this invention and in wide use today is by hammer or press forging utilizing moving die halves to deform a heated billet and force the metal to conform to the shape of the die cavities. This movement of metal is generally accomplished in two or more stages in order to minimize the amount of material which cannot be retained in the final cavity. This wasted material, called "flash", is necessary to serve to restrict the movement of material away from the die cavities. After the forming is completed, the flash is trimmed from the finished part and becomes scrap. The amount of material lost as flash is generally 20-30% of the original billet weight. The trimming operation introduces another dimensional variable which, when combined with the tolerances needed for die wear and mis-match of die halves, results in general industry standards of ±0.030" for most dimensions. The grain flow lines in the finished part will depend on the orientation of the original billet but, because of the flash formation, some of the lines must necessarily terminate at the trim line on the sides of the finished part.

The method of this invention solves the aforementioned problems and produces a more torque resistant product. A universal joint spider forging produced by the invention is flashless and hence is produced without the waste of any of the starting material. With the close manufacturing tolerances obtainable, and the absence of trimming, the forging produced by the invention can be held to a tolerance of ±0.005" in most dimensions, resulting in a part which can be machined faster with longer cutting tool life and with less scrap caused by alignment problems in the holding fixtures while machining. The grain flow lines in the finished forging have no terminations except on the ends of the legs and flow smoothly through the body from one leg to each adjacent leg for improved torque handling capabilities.

A forging produced in accordance with the invention can be subjected to further forming by hammer or press forging without substantial loss of the above benefits.

BRIEF SUMMARY OF THE INVENTION

A metal journal forging has a central body portion and four substantially equal legs circular in cross section which are integral with the body portion with the axis of each leg being at substantially a right angle to the axis of each adjacent leg. A curved portion extends between each adjacent pair of legs. The flow lines of the grain structure of the forging in each quadrant formed by the axes of the legs substantially parallel the contours of the exteriors of the legs and curved arcuate portion in the quadrant. The method for forming a metal cruciform journal forging comprises placing a metal forging billet in a die assembly having a main cavity for the reception of the metal cylinder and a pair of opposed cavities branching off from the main cavity at 90° to the main cavity. Equal compressive forces are exerted on the opposite ends of the billet in the direction of the billet axis to advance each of said ends towards each other at substantially the same rate and for the same predetermined distance to form two substantially equal opposed legs in the main cavity and force a portion of the metal billet into said branching cavities to form two substantially equal opposed legs substantially equal in length to the first two mentioned legs in the main cavity. Optionally, the outer ends of the formed legs in the branching cavities are subjected to opposite inwardly directed forces in the direction of their axes to shape said outer ends and promote the filling out of the branching die cavities. An additional option is to subject the metal being forced into the branching cavities to a resisting force during forming to assist in completely filling surface details.

BRIEF DESCRIPTION OF THE DRAWINGS

FIG. 1 is a partially exploded schematic view of extrusion die apparatus for use in the method of the invention showing two opposed punches prior to the commencement of their strokes;

FIG. 2 is a schematic plan view of the bottom die portion of FIG. 1 showing the punches after they have commenced their strokes;

FIG. 3 is a schematic plan view of a bottom portion of the die apparatus of FIG. 1 showing the punches having completed their strokes;

FIG. 4 is a plan view of a flashless metal universal joint spider made by the operations illustrated in FIGS. 1-3;

DETAILED DESCRIPTION

Figure 5:
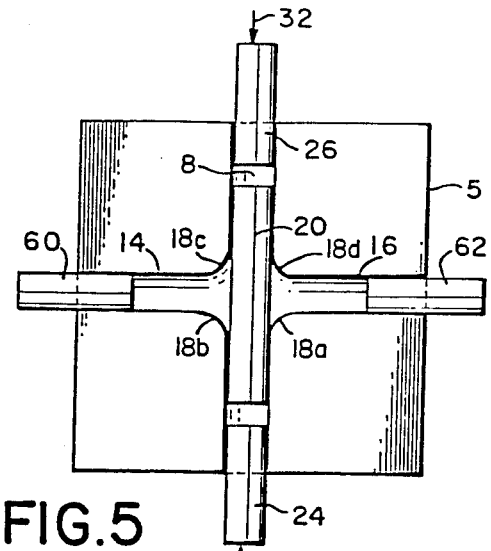
FIG. 5 is a schematic plan view of the bottom die portion of the die apparatus of FIG. 1 showing punches in the branching cavities.

For purposes of specific illustration, method and the forging of the invention will be discussed in connection with a universal joint spider forging.

Referring to FIG. 1, the method of the invention may be carried out in the die apparatus 2 having a top portion 4 which is adapted to be closed tightly down onto a bottom portion 5. Top portion 4 has a semicylindrical groove on either side of portion 4 and cooperating with a semicylindrical groove 8 in die portion 5. These grooves and the body between them form a main cavity. Top portion 4 has a semicylindrical groove 10 at 90° to groove 6 on either side of portion 4 and which cooperates with a semicylindrical groove 12 at 90° to groove 8 in die portion 5 to form a pair of branching cavities 14 and 16 the lower halves of which are shown in FIG. 1. The walls forming the junctions of the grooves 8 and 12 are arcuate as shown at 18A, 18B, 18C and 18D and are adapted to be opposite corresponding arcuate portions at the junctions of grooves 6 and 10 (not shown) so as to provide for a smooth flow of metal into branching cavities 14 and 16, a good grain structure and arcuate portions between the spider legs.

Before die top portion 4 is closed on bottom die portion 5, a solid cylindrical steel forging billet 20 is placed in groove 8. The flow lines of the grain structure of such a billet are parallel to the axis of the billet. The diameter of billet 20 is smaller than the diameter of the cavity formed by grooves 6 and 8 which latter diameter is the same as that of cavities 14 and 16. The die is then closed and punches 24 and 26 are advanced by opposed forces indicated by the arrows 30 and 32, the diameter of punches 24 and 26 being such as to fill the main cavity. Punches 24 and 26 are first brought into engagement with the ends of billet 20 to centralize the billet with respect to the branch cavities and are then advanced towards each other to advance the ends of the billet 20 towards each other at the same rate to fill out the volume of the die where the grooves intersect to form a body 44 and then to force a portion of the billet 20 into branching cavities 14 and 16 as illustrated in FIG. 2. Punches 24 and 26 are each advanced the same distance which is sufficient to force billet 20 into the branching cavities 14 and 16 sufficiently far to form legs 36 and 38 which are equal in length and which in turn are substantially equal in length to legs 40 and 42 in the main die cavity, all of said legs being connected to body 44 as shown in FIG. 3. Punches 24 and 26 are now withdrawn, the die opened and the completed flashless universal joint spider 48 which is shown in FIG. 4 removed. Legs 36 and 38 have somewhat dome-shaped ends 50 and 52 respectively and are circular in cross section.

Figure 6:
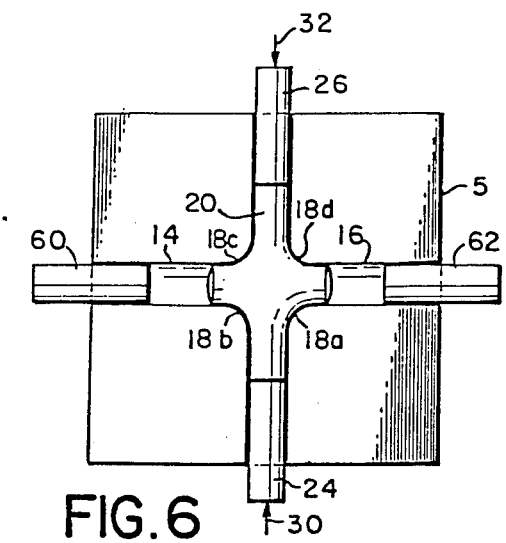
FIG. 6 is a schematic view of the apparatus of FIG. 5 showing the punches in the main die cavity after they have commenced their strokes.
Figure 7:
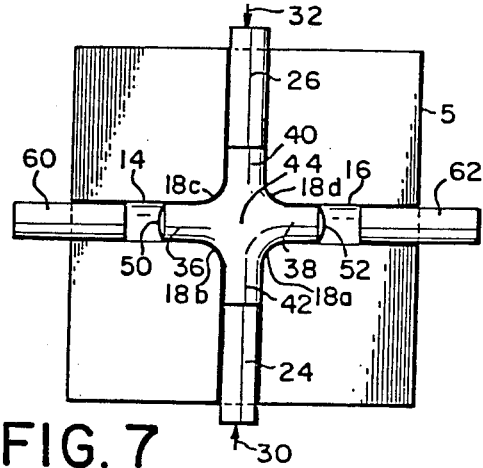
FIG. 7 is a schematic view of the apparatus of FIG. 5 showing the punches in the main cavity after they have completed their strokes.
Figure 8:
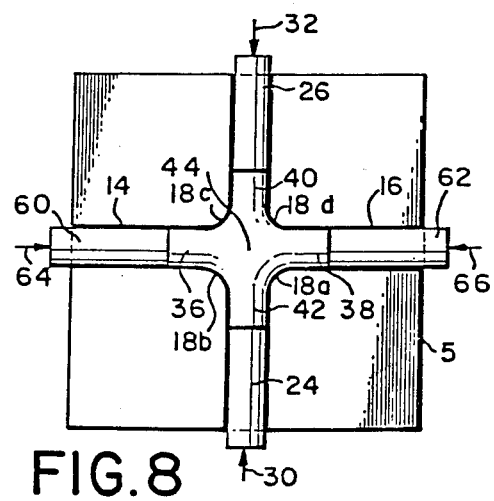
FIG. 8 is a schematic plan view of the apparatus of FIG. 5 showing the punches in the branching cavities exerting opposed forces on the ends of the legs in the branching cavities.
Figure 9:
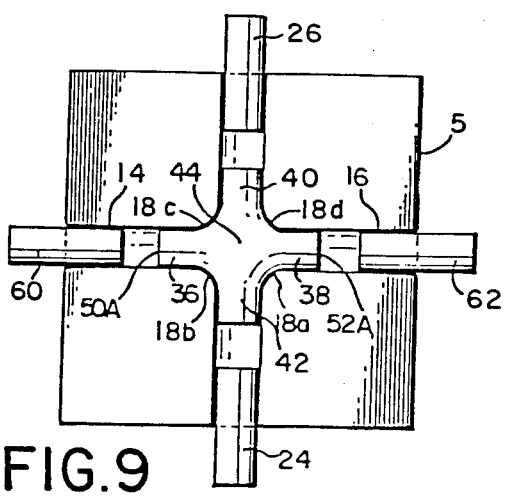
FIG. 9 is a schematic plan view of the apparatus of FIG. 5 showing all of the punches withdrawn.
Figure 10:
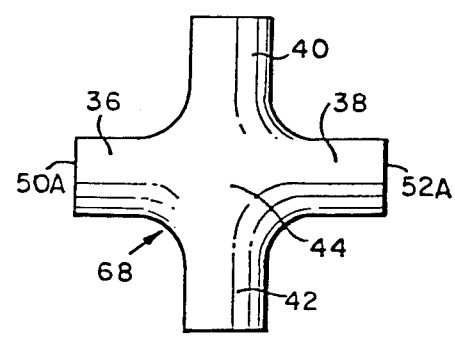
FIG. 10 is a plan view of a flashless universal joint spider forging made in accordance with the procedure shown in FIGS. 5-9.

An alternate method is illustrated in FIGS. 5 through 9. The method uses the same apparatus and steps used in the method illustrated in FIGS. 1 through 3 with the exception that punches 60 and 62 are engaged in branch cavities 14 and 16 respectively and have diameters filling these cavities. When the punches 24 and 26 have been advanced as illustrated in FIGS. 6 and 7 and as described above to form the spider 48, punches 60 and 62 are urged by opposed forces indicated by arrows 64 and 66 (FIG. 8) into contact with ends 50 and 52 with sufficient force to flatten said ends as illustrated in FIG. 8 and to insure that legs 36 and 38 fill out against the walls of branching cavities 14 and 16 respectively. The force required is insufficient to cause any movement of punches 24 and 26 which are held in their end-of-stroke positions. All of the punches are then withdrawn (FIG. 9) and the die opened. The spider 68 (FIG. 10) having been modified from spider 48 by providing flat ends 50a and 50b on legs 36 and 38 respectively is then removed.

Figure 11:
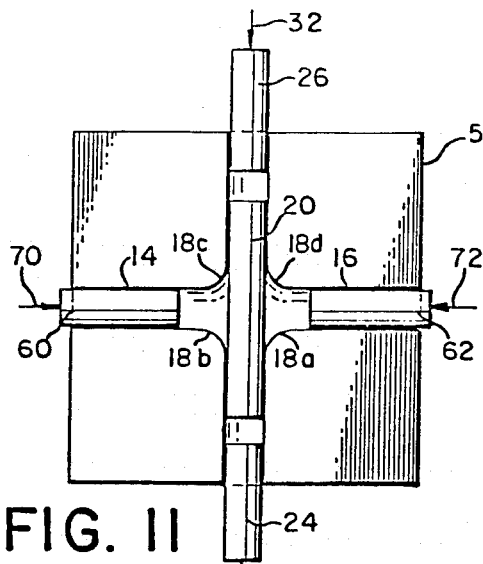
FIG. 11 is a schematic plan view of the bottom die portion of the apparatus of FIG. 1 showing the addition of punches in the branching cavities.
Figure 12:
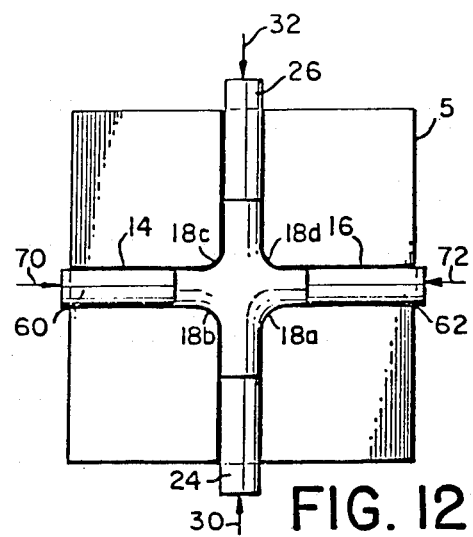
FIG. 12 is a schematic plan view of the apparatus of FIG. 11 showing the main cavity punches after their strokes have commenced and metal has been forced into the branching cavities engaging the punches in the branching cavities.
Figure 13:
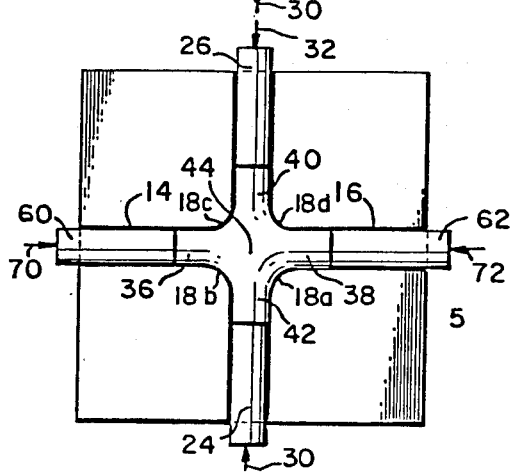
FIG. 13 is a schematic plan view of the apparatus of FIG. 11 showing the punches in the main cavity after they have completed their strokes and the metal in the branching cavities having forced the punches in the branching cavities outwardly.
Figure 14:
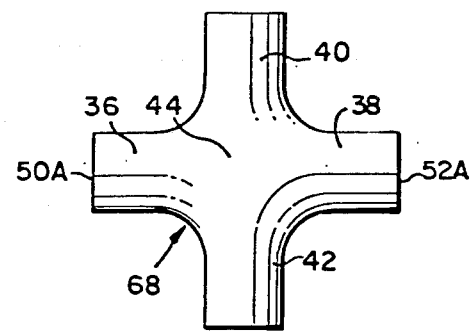
FIG. 14 is a plan view of a flashless universal joint spider forging made following the procedure illustrated in FIGS. 11 through 13.

A modified method illustrated in FIGS. 11 through 13 is the same as the method described with respect to FIGS. 5 through 9 but modifies the employment of punches 60 and 62. Here as shown in FIG. 11 punches 60 and 62 are positioned well inside branching cavities 14 and 16 respectively and have their outward movement opposed by equal resisting forces illustrated by arrows 70 and 72 respectively. Each of these resisting forces may be supplied, for example, by hydraulic cylinders and will be less than the force exerted on each of the punches 24 and 26.

As punches 24 and 26 are advanced inwardly, the metal flowing into branching cavities 14 and 16 engages (FIG. 12) punches 60 and 62 and the further entry of the metal in the branching cavities is resisted by the forces 70 and 72, the resisting forces being equal and insufficient to prevent the entry of metal into the branching cavities but sufficient to cause it to fully fill out against the walls of the die cavities. Here again punches 24 and 26 are stopped when legs 40 and 42 in the main die cavity are the desired length and additional forces are applied to punches 60 and 62, if necessary, to properly square the ends of branch legs 36 and 38 as illustrated in FIG. 13. The punches are withdrawn, the die opened and the spider 68 removed, the spider 68 being the same as the spider of FIG. 10.

Figure 15:
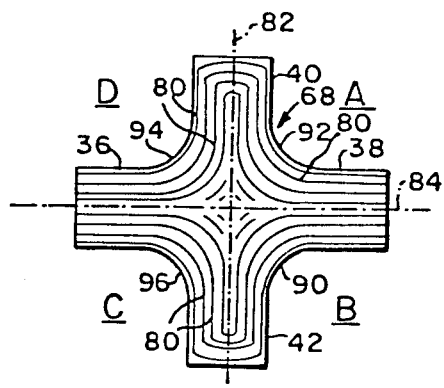
FIG. 15 is a schematic view illustrating the flow lines of the grain structure in the spider of FIG. 14.

Adverting to FIG. 15, it is seen that the flow lines 80 of the grain structure of the spider 68 in each of the quadrants A, B, C and D formed by the intersecting axes of legs 36, 38, 40 and 42 indicated by lines 82 and 84 are substantially parallel to the sides of the legs and the curved arcuate portions 90, 92, 94 and 96 extending respectively between the sides of adjacent pairs of legs 42 and 38, 38 and 40, 40 and 36, and 36 and 42. The flow lines are oriented for maximum strength and resistance to fatigue for the torque-type application of a spider.

Figure 16:
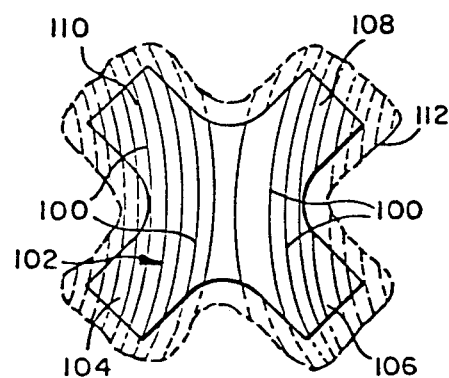
FIG. 16 is a schematic view of the flow lines in a universal joint spider forging made by hammer or press forging.

By way of contrast, FIG. 16 shows the orientation of flow lines 100 of the grain structure of a spider 102 made by the conventional normally used press or hammer forging method. Spider 102 has four legs, 104, 106, 108 and 110, equally spaced. To clarify the understanding of the flow lines 100, the outer border of the flash which is removed is indicated by the broken line 112. As is illustrated, a large number of the flow lines 100 do not contour smoothly from one leg to the adjacent leg, but rather terminate at the edges of the leg which substantially reduces the strength and resistance to fatigue of the spider in a universal joint application.

It should also be noted here that the flow lines of the grain structures in the spiders of the above-cited U.S. Pat. Nos. 3,583,198 and 3,896,651 are markedly different from flow lines of the conventionally made spider shown in FIG. 16 since they do not flow in planes generally parallel to the plane containing the axes of the legs but rather in planes perpendicular to such planes.

The method described in connection with FIGS. 5 through 9 is the most advantageous.

For some applications it is preferred to have the legs vary in diameter which is readily accomplished by varying the diameter of the die cavities. Similarly the configuration of the body of the forging may be varied by die changes so long as the portions of the forgings where the sides of the legs join are curved to form a smooth transition between legs. In carrying out the method, either a hot or a cold billet may be employed. Advantageously, the walls of the die cavities or the billet are coated with a lubricant such as colloidal graphite. Other metals such as brass, bronze or aluminum may be employed.

It will be understood that the above-described embodiments are illustrative and are not intended to be limiting.

We claim:

1. A metal cruciform journal forging made by:
    placing a cylindrical metal forging billet in a die assembly having a main cavity for the reception of the billet and a pair of opposed cavities branching off from said main cavity at 90° to the main cavity, said billet being centralized with respect to the branching cavities and
    exerting equal compressive forces on the opposite ends of said billet in the main cavity in the direction of the billet axis to advance each of said ends towards each other at substantially the same rate and for the same predetermined distance to form two substantially equal legs in the main cavity, to force a portion of the metal cylinder into said branching cavities to form two substantially equal opposed legs comparable in length to the first two mentioned legs in the main cavity and to form a metal cruciform journal forging having a grain structure that has flow lines that in each quadrant formed by the axes of the legs substantially parallel the contours of the exteriors of the legs and curved portion in the quadrant and are interrupted only at the ends of two legs, the metal cruciform journal forging having a substantially solid, non-hollow structure.

2. A journal forging made by the method set forth in claim 1 in which the outer ends of the legs in the branching cavities are subjected to opposite inwardly directed forces in the direction of their axes to shape the outer ends and to promote the filling out of the branching die cavities.

3. A journal forging made by the method of claim 2 in which the portions of the cavities in which the legs are formed are circular cross section.

4. A journal forging made by the method of claim 1 in which the portions of the cavities in which the legs are formed are cylindrical.

5. A journal forging made by the method set forth in claim 1 in which a resisting force is exerted on the metal.

6. A journal forging made by the method of claim 5 in which the portions of the cavities in which the legs are formed are circular cross section.

7. A journal forging made by the method of claim 5 in which the portions of the cavities in which the legs are formed are cylindrical.

8. A journal forging made by the method of claim 1 in which the portions of the cavities in which the legs are formed are circular cross section.

9. A journal forging made by the method of claim 1 in which the portions of the cavities in which the legs are formed are cylindrical.

10. A metal cruciform journal forging comprising:
    a central body portion, four legs having comparable lengths and being integral with said body portion with the axis of each leg being at substantially a right angle to the axis of each adjacent leg,
    the body portion and the legs having a substantially solid, non-hollow structure,
    a curved portion extending between the sides of each adjacent pair of legs,
    the flow lines of the grain structure of said spider in each quadrant formed by the axes of the legs substantially paralleling the contours of the exteriors of the legs and curved portion in the quadrant and interrupted only at the ends of two legs.

11. The forging journal of claim 10 in which the legs are circular in cross section.

12. The forging journal of claim 10 in which the legs are cylindrical.

13. A flashless metal universal joint spider comprising:
    a central body portion, four legs having comparable lengths and being integral with said body portion with the axis of each leg being at substantially a right angle to the axis of each adjacent leg,
    the body portion and the legs having a substantially solid, non-hollow structure,
    a curved portion extending between the sides of each adjacent pair of legs,
    the flow lines of the grain structure of said spider in each quadrant formed by the axes of the legs substantially paralleling the contours of the exteriors of the legs and curved portion in the quadrant and interrupted only at the ends of two legs.

14. A spider in accordance with claim 13 in which the legs are circular in cross section.

15. A spider in accordance with claim 13 in which the legs are cylindrical.

16. A metal cruciform journal forging made by:
    placing a cylindrical metal forging billet in a die assembly having a main cavity for the reception of the billet and a pair of opposed cavities branching off from said main cavity at 90° to the main cavity, said billet being centralized with respect to the branching cavities and exerting equal compressive forces on the opposite ends of said billet in the main cavity in the direction of the billet axis to advance each of said ends towards each other at substantially the same rate and for the same predetermined distance to form two substantially equal legs in the main cavity, to force a portion of the metal cylinder into said branching cavities to form two substantially equal opposed legs comparable in length to the first two mentioned legs in the main cavity and to form a metal cruciform journal forging having a grain structure that has flow lines that in each quadrant formed by the axes of the legs substantially parallel the contours of the exteriors of the legs and curved portion in the quadrant and are interrupted only at the ends of two legs, the metal cruciform journal forging having a substantially solid, non-hollow structure, exerting a resisting force on the metal being forced into the branch cavities to shape the outer ends of the legs being formed in the branching cavities and promote the filling out of the branching cavities, the portions of the cavities in which the legs are formed being cylindrical.

17. A flashless metal cruciform journal forging comprising:

a central body portion, four legs having comparable lengths and being integral with said body portion with the axis of each leg being at substantially a right angle to the axis of each adjacent leg, the body portion and the legs having a substantially solid, non-hollow structure, a curved portion extending between the sides of each adjacent pair of legs, the flow lines of the grain structure of said spider in each quadrant formed by the axes of the legs substantially paralleling the contours of the exteriors of the legs and curved portion in the quadrant and interrupted only at the ends of two legs, the legs being cylindrical.

* * * * *